(12) United States Patent
Nguyen et al.

(10) Patent No.: US 8,428,585 B2
(45) Date of Patent: Apr. 23, 2013

(54) METHOD FOR ADAPTIVE SCANNING IN A WIRELESS NETWORK AND A WIRELESS NETWORK

(75) Inventors: Van Minh Nguyen, Le-Kremlin-Bicetre (FR); Olivier Marce, Massy (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/142,072

(22) PCT Filed: Dec. 21, 2009

(86) PCT No.: PCT/EP2009/009205
§ 371 (c)(1),
(2), (4) Date: Sep. 13, 2011

(87) PCT Pub. No.: WO2010/075991
PCT Pub. Date: Jul. 8, 2010

(65) Prior Publication Data
US 2011/0319077 A1    Dec. 29, 2011

(30) Foreign Application Priority Data

Dec. 31, 2008 (EP) .................................. 08291265

(51) Int. Cl.
*H04W 4/00* (2009.01)
(52) U.S. Cl.
USPC ............ 455/434; 455/436; 370/338; 370/331

(58) Field of Classification Search .................. 455/436, 455/434; 370/338, 331
See application file for complete search history.

(56) References Cited

U.S. PATENT DOCUMENTS

| | | | |
|---|---|---|---|
| 2007/0265001 A1* | 11/2007 | Dias et al. | 455/435.1 |
| 2007/0275746 A1 | 11/2007 | Bitran | |
| 2008/0096572 A1 | 4/2008 | Hsu et al. | |
| 2009/0016303 A1* | 1/2009 | Shaik et al. | 370/331 |
| 2009/0227255 A1* | 9/2009 | Thakare | 455/434 |
| 2009/0280812 A1* | 11/2009 | Cheng et al. | 455/436 |

OTHER PUBLICATIONS

R. Rouil et al., "Adaptive Channel Scanning for IEEE 802.16e," Military Communications Conference, 2006, pp. 1-6, XP002531384, retrieved from the Internet on Jun. 9, 2009.
International Search Report for PCT/EP2009/009205 dated May 12, 2010.

* cited by examiner

*Primary Examiner* — Kwasi Karikari
(74) *Attorney, Agent, or Firm* — Fay Sharpe LLP

(57) ABSTRACT

A method for scanning in a wireless network 3 comprises determining attributes for an on-going service of a mobile station, MS 5 and allocating scanning intervals for the MS depending on the determined attributes. The attributes for the ongoing service may include at least one of: type of service; and quality of service requirements. In one method, scanning intervals for the MS are allocated by a base station 4 also depending on the size of the neighbor cell list. The wireless network may, for example, be a WiMAX network.

10 Claims, 2 Drawing Sheets

METHOD FOR ADAPTIVE SCANNING IN A WIRELESS NETWORK AND A WIRELESS NETWORK

FIELD OF THE INVENTION

The present invention relates to a method for adaptive scanning in a wireless network and to a wireless network having adaptive scanning. The method may be applied more particularly, but not exclusively, to broadband access mobile networks.

BACKGROUND

In a typical wireless cellular network, an active mobile is registered to a cell, termed the serving cell. When the signal quality received by the mobile from the serving cell is insufficient, the mobile must find another cell to be used as the new serving cell. This procedure of selecting a new serving cell is called handover, and the cell selected as the new serving cell is called the handover target cell. In one network, for example, the current serving cell broadcasts a list of neighboring cells that are potential candidates for selection as the handover target cell. This list is referred to as the neighbor cell list.

To find a suitable target cell, the mobile scans cells included in the neighbor cell list. The neighbor cell list must include enough potential candidates so that even where the position of the mobile is uncertain or the current state of neighboring cells is unknown, it is likely that the mobile will be able to find a target cell with a sufficiently powerful signal or good enough signal-to interference ratio (SINR) to enable to mobile to successfully handover to a target cell and attach to it. The serving cell allocates time intervals during which the mobile may perform the scanning procedure. The time duration during which the mobile performs scanning is divided into interleaving intervals: time periods for normal transmission (called listening intervals); and time periods for scanning (called scanning intervals).

Some types of wireless network currently being developed aim to provide broadband access mobile networks, such as those in accordance with IEEE 802 standards, also sometimes referred to as WiMAX. In one WiMAX network, as schematically shown in FIG. 1, a serving base station 1 serving a mobile 2 sends a message MOB_NBR-ADV to the mobile 2 at intervals. This message includes a neighbour cell list. At a time t1, the mobile 2 determines that handover may be required, for example, if the quality of the signal it is receiving from its serving cell drops below a threshold quality level. The mobile 2 sends a message MOB_SCN-REQ to the base station 1 indicating that it needs to perform scanning. The base station 1 sends a message MOB_SCN-RSP giving time periods allocated to the mobile 2 as scanning intervals. The mobile 2 then scans the cells in the neighbour cell list at the times defined as scanning intervals. During scanning, there is no communication of payload data between the mobile 2 and its serving cell. Thus throughput of data is reduced compared to periods when no scanning is required.

BRIEF SUMMARY

According to a first aspect of the invention, a method for adaptive scanning in a wireless network comprises determining attributes for an on-going service of a mobile station, MS. Scanning intervals for the MS are allocated depending on the determined attributes. In one method, the attributes for the on-going service include at least one of: type of service; and quality of service requirements. By employing the method, the impact of scanning on performance may be limited while still taking into account requirements of the ongoing service.

In a method in accordance with the invention, a neighbor cell list for scanning by the MS is selected depending on attributes of the on-going service. There may be a plurality of neighbor cell lists potentially available to be sent to a mobile. By recognizing that different services require different levels of the quality of service, the neighbor cell list may be appropriately longer or shorter such that the quality of the handover target cell meets the requirements of the ongoing service while tending to minimize performance degradation. For example, by considering the attributes of the on-going service, it may be possible to select a list having fewer candidates for scanning, thus reducing scanning time required and providing increased listening time for normal communication with the mobile and hence enhancing data throughput. If, in contrast, a fixed neighbor list is used without regard to the attributes of the on-going service, it may result in a long scanning time without added benefit. Where scanning occupies a significant time, radio conditions may change by the time scanning is complete and the decision making for selecting a target cell may then be unreliable.

In a method in accordance with the invention, scanning intervals for the MS are allocated depending on the size of the neighbor cell list for scanning by the MS.

One method in accordance with the invention is used with a WiMAX network. A method in accordance with the invention may be used in other types of wireless network, for example, in a 3GPP Long Term Evolution (LTE) implemented network, in which case the base station an eNodeB and the MS is referred to as an UE (user equipment). A method in accordance with the invention may be used with other types of network technology involving handover from one network node to another, and is not necessarily constrained to fourth generation (4G) networks or to networks offering broadband mobile access. A method in accordance with the invention may be applied, for example, where handover takes place within a single network, or between different networks of the same technology type. In one embodiment, a method in accordance with the invention is used in handover from a network element included in a network of one technology type to a target network element in a network of a different technology type.

According to a second aspect of the invention, a wireless network comprises a plurality of base stations, and includes an adaptive time allocation module operative to allocate scanning intervals for a mobile station, MS, depending on determined attributes for an on-going service of a mobile station, MS.

BRIEF DESCRIPTION OF THE DRAWINGS

Some embodiments of the present invention will now be described by way of example only, and with reference to the accompanying drawings, in which.

DETAILED DESCRIPTION

Figure 1:
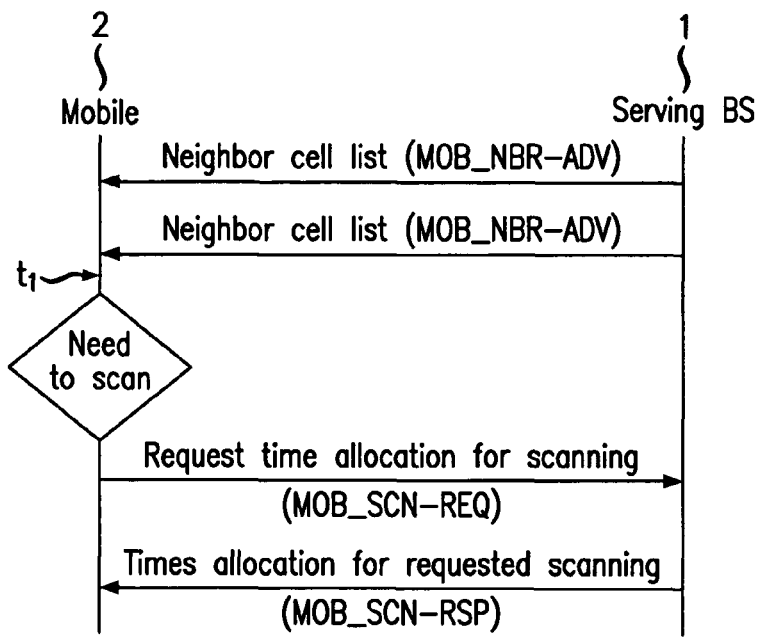
FIG. 1 schematically illustrates operation of a previously known WiMAX network.
Figure 2:
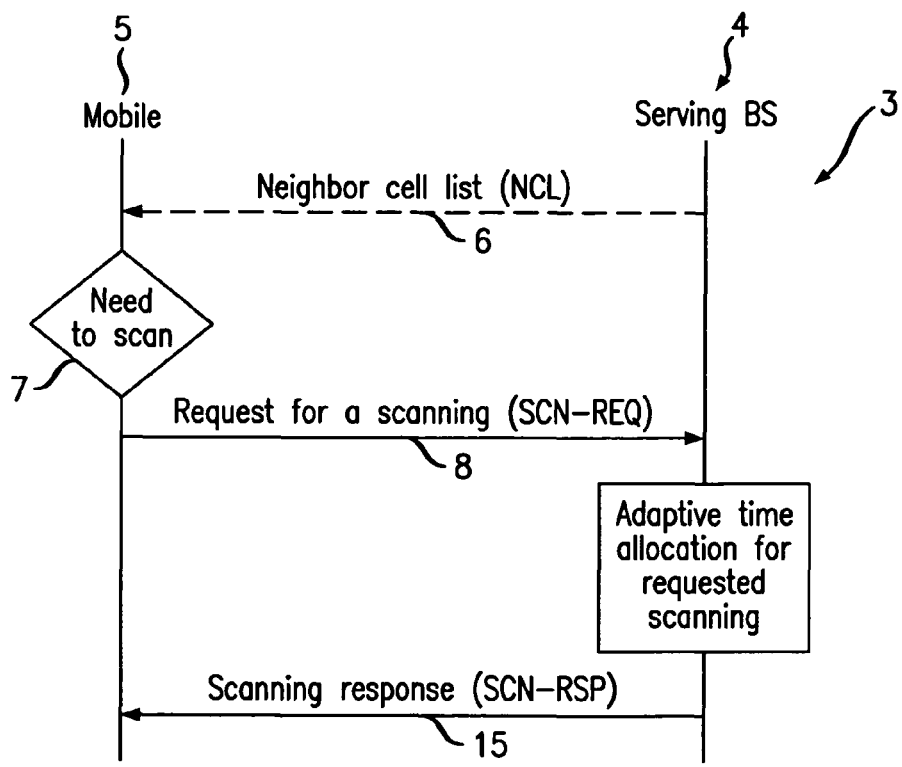
FIG. 2 schematically illustrates a method and network in accordance with the invention.

With reference to FIG. 2, a WiMAX network 3 includes a plurality of base stations, one of which 4 is shown. The base station 4 is a serving base station for a mobile, MS 5, for which it provides a serving cell. The serving base station 4 may send a neighbour cell list (NCL) to the MS 5, shown as the broken line 6, as in the prior arrangement illustrated in FIG. 1. However, this may be an optional step, with the NCL being transmitted to the MS 5 at a later stage during the handover procedure.

When the MS 5 detects the necessity to perform a handover at 7, it sends a scanning request SCN-REQ 8 to the base station 4.

Figure 3:
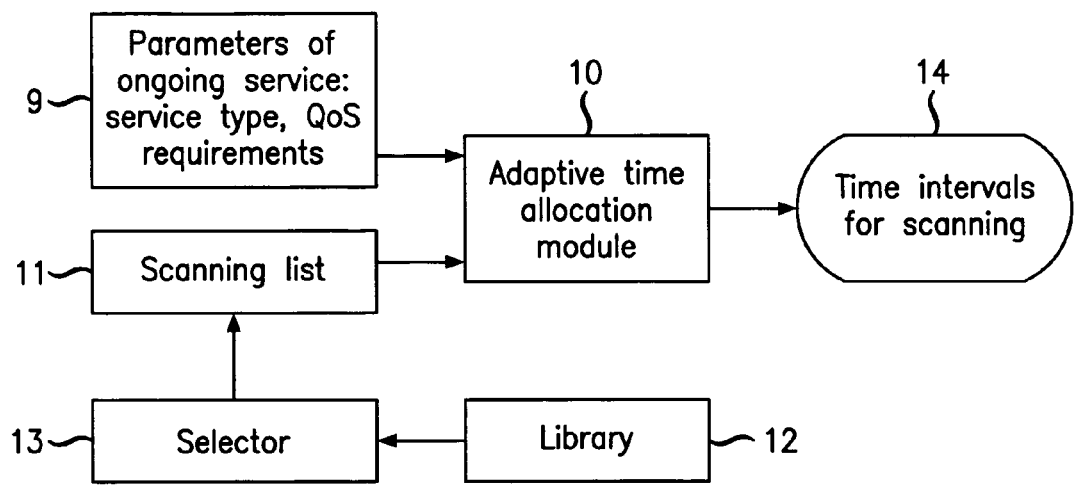
FIG. 3 schematically illustrates a base station included in the network of FIG. 2.

The base station 4 includes a processor 9, shown in FIG. 3, which determines attributes of the on-going service with which the MS 5 is concerned. The actual attributes selected are dependent on the particular network or base station set up. In this example, the processor 9 identifies the type of the service, such as streaming video, VoIP or some other type, and also various quality of service (QoS) requirements, such as the maximum latency tolerance, the minimum sustain throughput, and so on. QoS parameters may be taken either by retrieving the information from profiles, from base station management data, from measurements, or by any other way. The result of the determination is applied to an adaptive time allocation module 10.

In one embodiment, a common scanning list of neighboring cells is used for all mobiles. The list is held in store 11 and the size of the list is applied to the adaptive time allocation module 10.

Where different scanning lists are available, and the most appropriate is selected for use with a specific mobile, the lists are held in a library 12. A selector 13 access the library 12 and inputs the chosen list to the scanning list store 11.

The adaptive time allocation module 10 then computes the best time intervals for the scanning to give an output 14. The serving base station 4 responds to the mobile 5 with the scanning list and the allocated time intervals via a message SCN-RSP 15. Thus the requirements of the ongoing service may be respected, the throughput reduction due to scanning minimized, and the total scanning duration minimized.

Figure 4:
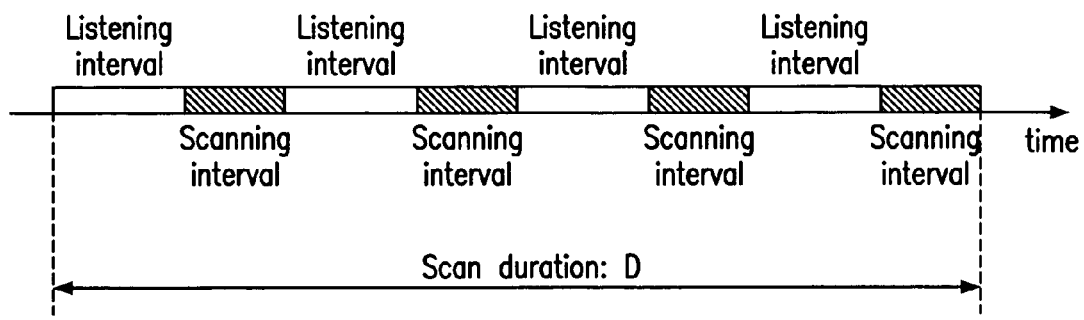
FIG. 4 is a schematic exemplary diagram.

Times in a scanning are shown in FIG. 4. Here the duration to complete the scanning is called Scan Duration, D. The sum of all the Listening Intervals is denoted by L. Assume that the scanning list has N cells, and the mobile needs to time A to scan a cell with the desired precision. The mobile will need a time duration S=N×A to scan this list.

The transmission-to-scanning ratio, R, is such that R=L/S (the mobile has normal transmission during Listening intervals). Thus, D=L+S=(R+1)×S.

In one embodiment, the time L is allocated such that the ratio R is limited within a range [Rmin, Rmax]. The lower bound Rmin allows a minimum throughput with the serving cell during scanning, while the upper bound Rmax prevents the scan duration D from a rapid increment.

An example of time allocation is given below:

```
        Given:    Minimum required throughput, maximum latency
    tolerance, etc. of the ongoing service,
                  N - size of the scanning list, and
                  Confident limit of the scan duration Dmax
        Compute:  Rmin, Rmax, and
                  S - time needed to scan N cells
        If:       (Rmax+1)×S <= Dmax
            then:     L = Rmax × S
            else if:  (Rmin+1)×S <= Dmax
            then:     L = Dmax - S
            else:     L = Rmin × S
```

This time allocation policy permits a longer scanning list than would a policy that allocates the time L without taking into account the size of the scanning list.

Adaptive time allocation for scanning in accordance with the invention may thus permit impact of the scanning on the ongoing service to be limited and enhances the overall capacity of the network, as well as the performance of the handover, and thus the overall quality of the network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for adaptive scanning in a wireless network comprising:
    determining attributes for an on-going service of a mobile station, MS; and
    allocating scanning intervals for the MS depending on the determined attributes and on the size of a neighbor cell list for scanning by the MS;
    wherein the network is implemented in accordance with a broadband mobile standard; and
    wherein the time allocation is selected such that ratio R of listening interval, L, to scanning interval, S, over the scan duration Dmax is limited within a range [Rmin, Rmax] such that:

```
        if: (Rmax+1) ×S <= Dmax
            then: L = Rmax × S
        else if: (Rmin+1)×S <= Dmax
            then: L = Dmax - S
            else: L = Rmin × S.
```

2. The method as claimed in claim 1 and wherein the attributes for the on-going service include at least one of: type of service; and quality of service requirements.

3. The method as claimed in claim 1 and wherein the neighbor cell list for scanning by the MS is selected depending on attributes of the on-going service.

4. The method as claimed in claim 1 and wherein the MS is in communication with a serving base station of the wireless network and the serving base station allocates the scanning intervals and communicates information about the allocated scanning intervals to the MS.

5. The method as claimed in claim 1 and wherein the network is implemented in accordance with WiMAX standards.

6. The method as claimed in claim 1 and wherein the MS is in communication with a serving base station of the wireless network and including: the serving base station receiving a scanning request from the MS when it needs to handover; upon receipt of the scanning request, the serving base station computing time intervals to be allocated for scanning by the MS; and the serving base station responding to the MS with a list of cells to be scanned and the allocated time intervals.

7. A wireless network comprising a plurality of base stations, and comprising:
    an adaptive time allocation module operative to allocate scanning intervals for a mobile station, MS, depending on determined attributes for an on-going service of a mobile station, MS, and depending on a size of a neighbor cell list;

wherein a time allocation is selected such that ratio R of listening interval, L, to scanning interval, S, over the scan duration Dmax is limited within a range [Rmin, Rmax] such that:

$$
\begin{aligned}
&\text{if: } (Rmax+1) \times S <= Dmax \\
&\quad \text{then:} \quad L = Rmax \times S \\
&\text{else if:} \quad (Rmin+1) \times S <= Dmax \\
&\quad \text{then:} \quad L = Dmax - S \\
&\quad \text{else:} \quad L = Rmin \times S.
\end{aligned}
$$

8. The network as claimed in claim 7 and wherein the determined attributes for the on-going service include at least one of: type of service; and quality of service requirements.

9. The network as claimed in claim 7 and including a selector for selecting the neighbor cell list for scanning by the MS depending on attributes of the on-going service.

10. The network as claimed in claim 7 and wherein the time allocation module is located at a base station serving the MS.

\* \* \* \* \*